United States Patent [19]

Garodnick et al.

[11] 4,099,203
[45] Jul. 4, 1978

[54] TELEVISION SIGNAL SCRAMBLING WITH INTRODUCTION OF REPLACEMENT PROGRAM SIGNALS

[76] Inventors: Joseph Garodnick, 1 Wall St., Fort Lee, N.J. 07024; Joseph L. Stern, 45 Windsor Rd., Great Neck, N.Y. 11021

[21] Appl. No.: 756,816

[22] Filed: Jan. 5, 1977

[51] Int. Cl.² ............................................. H04N 1/44
[52] U.S. Cl. .................................... 358/118; 358/121
[58] Field of Search ............... 358/118, 115, 116, 120, 358/121; 179/1.5 M

[56] References Cited

U.S. PATENT DOCUMENTS

| | | | |
|---|---|---|---|
| 3,202,758 | 8/1965 | Brownstein | 358/118 |
| 3,347,982 | 10/1967 | Bass et al. | 358/118 |
| 3,896,262 | 7/1975 | Hudspeth et al. | 358/118 |
| 4,074,311 | 2/1978 | Tanner et al. | 358/118 |

*Primary Examiner*—S. C. Buczinski
*Attorney, Agent, or Firm*—Darby & Darby

[57] ABSTRACT

A method and apparatus are provided for blocking the reception of a subscription television program signal while substituting for the blocked signal a replacement program signal which is received by the blocked receiver. A single radio frequency signal, serving as an interfering carrier, is provided intermediate the audio and video carriers of the subscription signal and is modulated with a substitute audio and/or video program signal. The frequency of the interfering carrier is selected so that beat frequencies (i.e. sum and difference frequencies with carrier frequencies of the subscription program), which result from the non-linear characteristics of a conventional television receiver, or harmonics of the beat frequencies which are similarly produced, will block reception of the subscription television signal. These non-linear receiver characteristics also produce replicas of the interfering carrier modulation in the bands of the normally detected audio and video intermediate frequency signals in the receiver and these replicas replace the blocked subscription television program and are reproduced by the receiver. At an authorized receiver, there is provided a band-elimination filter, or the like, which is placed ahead of the receiver and is tuned to the interference carrier. As a result, the modulated interference carrier is removed prior to being applied to the receiver, so that the subscription television program can be received in the usual manner at the authorized receiver.

32 Claims, 4 Drawing Figures

TELEVISION SIGNAL SCRAMBLING WITH INTRODUCTION OF REPLACEMENT PROGRAM SIGNALS

The present invention relates generally to television communication systems and, more particularly, concerns a method and apparatus for scrambling subscription television programs so that an unauthorized receiver will not receive an intelligible television program, which method and apparatus also permit the substitution of replacement program material for the subscription television program.

As used herein, the term "subscription television system" is intended to encompass all television communication systems in which a television program signal, which is recoverable by a general group of television receivers, is intended to be recovered by only specific authorized ones of the receivers. The descriptive term "subscription television" is intended to be similarly broadly interpreted.

In conventional television broadcasting, each transmitter station is assigned a channel having a predefined frequency bandwidth. The signal produced by each station includes an audio carrier signal and a video carrier signal disposed near opposite ends of the assigned channel and modulated, respectively, to carry the audio and video portions of the program. By convention (in the United States), commercial television channels are 6 megahertz wide and the video and audio carriers are disposed, respectively, at 1.25 megahertz and 5.75 megahertz above the lower boundary of the channel. Also by convention, video information is amplitude-modulated onto the video carrier and audio information is frequency-modulated onto the audio carrier.

In subscription television systems (for example, in modern cable television systems), it is customary to withhold a program from an unauthorized receiver or to provide the program, but to condition the program signal so that it is unintelligible unless received by an authorized subscriber. Various methods have been suggested for scrambling a television signal to render it unintelligible, including the injection into the television signal of radio frequency (RF) spoiling signals or "tones" to interfere with the reception of the signal.

In a technical paper entitled "Thick Film Technology for Pay TV Security: The T.E.S.T. System", which paper was presented by B. Becht at the 1976 Annual National Cable Television Association Convention, it is suggested that a modulated RF spoiling signal at a frequency intermediate the video and audio carrier signals can be added to a subscription television signal to scramble it. The spoiling signal is amplitude-modulated with tones selected to interfere with the video and audio information detected by a conventional television receiver. Normal reception of the subscription television signal (i.e., unscrambling) is accomplished by extracting the amplitude modulated spoiling signal ahead of the receiver.

It has also been suggested that, in addition to spoiling tones, an auxiliary carrier signal, which is modulated with promotional audio information, be injected into the RF television signal in order to provide a replacement audio signal while blocking reception of the regular television program. For example, U.S. Pat. No. 3,202,758, issued to G. Brownstein on Aug. 24, 1965, suggests that a spoiling tone at a frequency below the video carrier be inserted into the RF television signal together with an auxiliary carrier signal modulated with substitute audio information. The spoiling tone is provided at a frequency that will cause maximum interference with the video information and the auxiliary carrier signal is inserted at 4.5 MHz above the spoiling tone. At a television receiver, the spoiling tone and auxiliary carrier interact to provide a replica of the substitute information at their difference frequency of 4.5 MHz, which corresponds to the intermediate frequency for sound detection in an "intercarrier" type system. A major shortcoming of this method of introducing substitute audio is that it requires both a spoiling tone and a modulated auxiliary carrier.

Although methods and apparatus have been available for blocking the unauthorized reception of television programs while permitting the insertion of a substitute audio or promotional message, such methods and apparatus have a number of disadvantages undesirable in equipment of this type. As in the aforementioned Brownstein patent, a typical arrangement has required the insertion of interfering signals at, at least, two different frequencies in order to block the reception of both the video and audio portions of the program. This proves disadvantageous because, at an authorized receiver, a relatively complex and expensive, sharply tuned, band-elimination filter must be provided to remove each of the spoiling tones. Where an auxiliary audio-modulated carrier signal is injected together with at least one spoiling tone, further filtering is required at an authorized receiver to prevent interference with the regular television program. In addition, prior art scrambling arrangements have required that spoiling tones be injected in close proximity to the video and/or audio carriers, in order effectively to block the reception of the television signal at an unauthorized receiver. At an authorized receiver, the band-elimination filters which remove the spoiling tones may also remove some important portions of the television signal and thereby reduce the signal-to-noise ratio at the receiver.

Broadly, it is an object of this invention to block the unauthorized reception of a subscription television program while substituting promotional or other replacement material for the television program. More specifically, it is within the contemplation of the present invention to provide a method and apparatus for scrambling or blocking both the audio and video portions of a subscription television signal without the requirement of employing a plurality of spoiling signals at different RF carrier frequencies and for permitting the introduction of a replacement program signal which may have either or both audio and video components.

It is another object of this invention to provide a method and apparatus for scrambling a subscription television signal with spoiling signals which permit ready and economical removal of the spoiling signals at an authorized receiver without introducing an excessive reduction in signal-to-noise ratio at the receiver.

It is a further object of this invention to provide a method and apparatus for blocking unauthorized reception of subscription television signals while permitting the introduction of a substitute television signal, which method and apparatus can be employed in existing subscription television systems with a minimum of modifications.

It is also an object of this invention to provide an apparatus for blocking unauthorized reception of a subscription television signal while permitting the introduction of a substitute television signal, which apparatus is efficient, convenient and reliable in use, yet relatively inexpensive and simple in construction.

In accordance with one aspect of the present invention, a single RF spoiling signal, serving as an interfering carrier, is provided intermediate the audio and video carriers and is modulated with a substitute television program signal. The frequency of the interfering carrier is selected so that beat frequencies (i.e., sum and difference frequencies of this carrier with the other carriers) which result from the non-linear characteristics of a conventional television receiver, or harmonics of the beat frequencies, which are similarly produced, will block reception of the subscription television signal. The non-linear receiver characteristics will also produce replicas of the interfering carrier modulation in the bands of the detected audio and video signals in the receiver, and these replicas replace the blocked subscription television program. At an authorized receiver, there is provided a band elimination filter, or other frequency eliminating device such as a phase-locked loop, which is tuned to the interference carrier and is placed ahead of the receiver. As a result, the interference carrier is removed prior to being applied to the receiver so that the subscription television program can be received in the usual manner.

In an illustrative embodiment demonstrating objects and features of the present invention, the interfering carrier signal is half way between the audio and video carriers, is frequency-modulated with substitute audio information, and is amplitude-modulated with substitute video information. At an unauthorized receiver, the subscription television program is blocked by the interaction in the receiver of the interfering signal with the audio and video carriers of the program signal, as explained above, and the substitute program, which may for example be promotional material, is received. At an authorized receiver, a filter is provided to remove the modulated interfering carrier signal and the subscription television program is received in the conventional manner.

The foregoing brief description, as well as further objects, features and advantages of the present invention, will be more completely understood from the following detailed description of a presently preferred, but nonetheless illustrative, embodiment in accordance with the present invention, with reference being had to the accompanying drawings in which.

Figure 2:
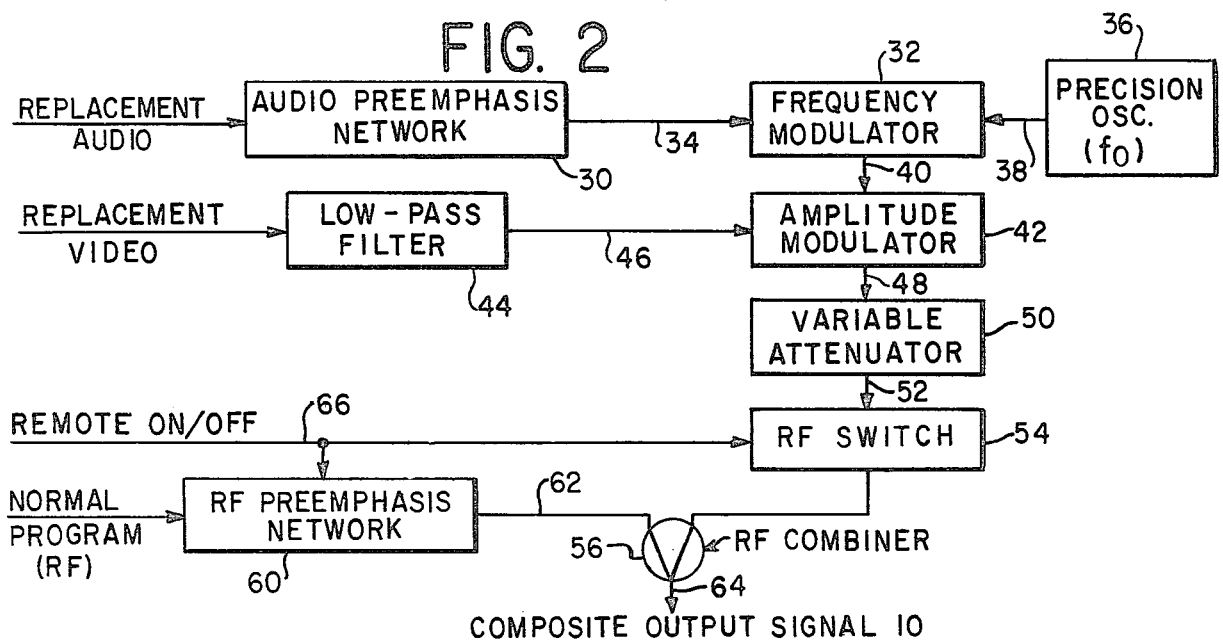
FIG. 2 is a functional block diagram illustrating the manner of modulating an interfering carrier with substitute program information and combining the modulated interfering carrier with a standard television signal, in accordance with a preferred embodiment of the present invention.
Figure 3:
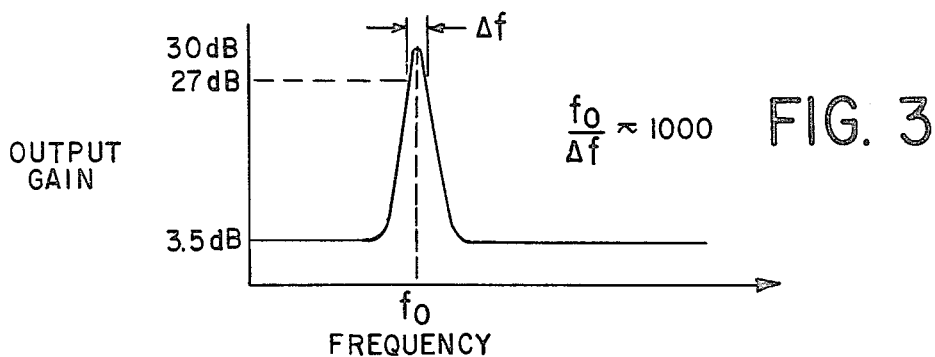
Figure 4:
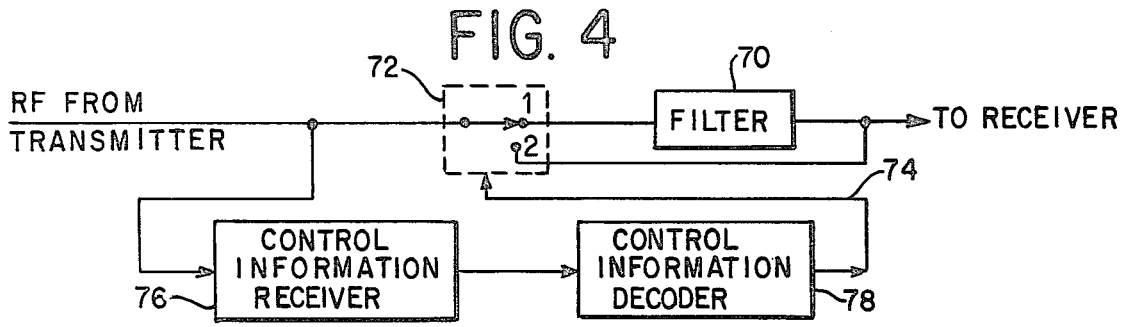

FIG. 3 is a frequency plot illustrating the preferred spectrum of the RF preemphasis network incorporated in the preferred embodiment of FIG. 2; and FIG. 4 is a functional block diagram illustrating the equipment that is incorporated at an authorized receiver to facilitate removal of the interfering carrier and the replacement program signal in order to permit reception of the regular subscription television program signal.

It has been found that, when an interference carrier signal is injected into a conventional television signal at any of a predefined set of frequencies intermediate the video and audio carrier signals, the interfering carrier signal will not only block normal reception of the conventional television signal, but, if appropriately modulated, can provide a replacement program signal for the conventional television signal. This phenomenon is believed to result from the non-linear response of a conventional television receiver to the various carrier signals (i.e. audio, video and interfering carrier signals) present in the composite RF television signal. A receiver having a non-linear response produces beat frequencies between various frequency components present in the several RF signals applied to the television receiver and also produces harmonics of the beat frequencies. Moreover, experimentation has shown that blocking of the normal television signal and the substitution of a replacement signal will occur when the frequency difference between the audio and video carrier signals of the normal television signal (i.e., 4.5 MHz) is an integral multiple (preferably a low multiple) of the frequency difference between the interfering carrier signal and either the video or audio carrier signal (i.e., when the frequency difference between the interfering carrier signal and one of the other carrier signals is an integral submultiple of the intermediate frequency for the conventional "intercarrier" audio detection system). When an interfering carrier signal of any of the above-defined frequencies is appropriately frequency-modulated with replacement audio signals, these audio signals will replace the regular audio program signals and will be reproduced by the receiver. Substitution of replacement video program material can be obtained with the same interfering carrier frequencies by appropriately amplitude-modulating the interfering carrier by the replacement video program signals.

Figure 1:
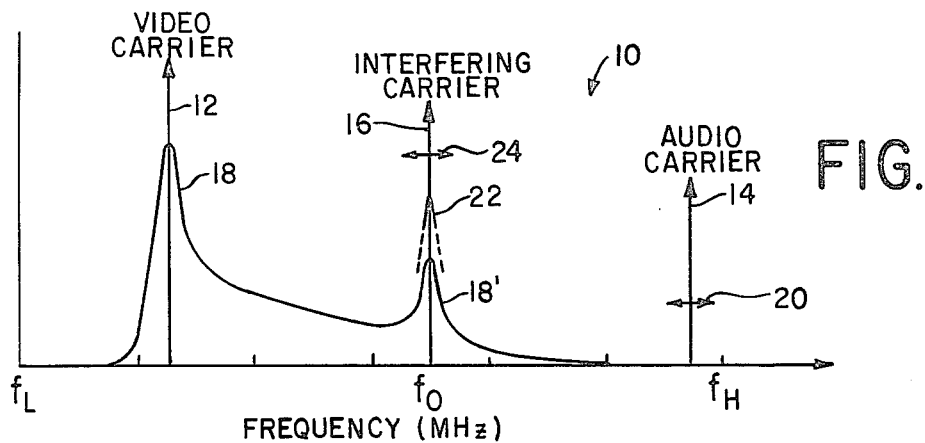
FIG. 1 is a frequency plot showing the spectrum of a composite radio frequency (RF) television signal modified in accordance with the present invention.

Referring now to the details of the drawings, and in particular to FIG. 1, there is shown the frequency spectrum of a composite RF television signal, indicated generally by the numeral 10, as modified in accordance with the present invention. The television signal is included in a channel ranging in frequency from a lower bounding frequency $f_L$ to an upper bounding frequency $f_H$, with a difference between $f_H$ and $f_L$ of 6 megahertz. For example, if the signal 10 is being transmitted over channel 4, $f_L$ and $f_H$ are equal to 66 megahertz and 72 megahertz, respectively. By convention (in the United States), a video carrier signal 12 is provided at 1.25 megahertz above $f_L$ and an audio carrier signal 14 is provided at 5.75 megahertz above $f_L$. Thus, for a channel 4 signal, the video and audio carrier signals are at 67.25 and 71.75 megahertz, respectively. In addition to the conventional components just described, the television signal 10 also includes an interfering carrier signal 16 at a frequency $f_O$, which is intermediate the video and audio carrier frequencies. For purposes of illustration, $f_O$ is shown in FIG. 1 as being half way between the video and audio carrier signals, or at a frequency of 69.5 megahertz for a channel 4 signal. However, the principles of the invention apply equally well if $f_O$ is spaced from the video carrier by a frequency which is an interger submultiple of 4.5 megahertz (preferably a low submultiple), as previously expained.

As is customary in commercial television broadcasting, the video carrier 12 is amplitude-modulated with video program information and the audio carrier 14 is frequency-modulated with audio program information. For illustrative purposes, the frequency spectrum of the modulated video carrier is schematically represented by waveform 18. It should be noted that the waveform 18 is preemphasized to produce a peak 18' in the vicinity of the frequency $f_O$ of the interfering carrier 16. The preemphasis compensates for the attenuation introduced in the vicinity of the frequency $f_O$ by the band-elimination filter which is provided at an authorized receiver to remove the interfering carrier signal, as described below. The spectrum of the modulated audio carrier signal 14 is not shown, but is represented schematically by the double-headed horizontal arrow 20 provided on the spectral line corresponding to the audio carrier 14.

Interfering carrier 16 is modulated with replacement information for the normal television program. In the embodiment of FIG. 1, the interfering carrier is amplitude-modulated with video information and frequency-modulated with audio information. The spectrum of the video information, which is represented by the partial waveform 22, is restricted to a narrow bandwidth of the order of magnitude of a conventional band-elimination filter so that it may be readily removed without appreciably degrading the normal video material. The spectrum of the audio portion of the substitute signal is not shown, but is represented schematically by the double-headed horizontal arrow 24 on interfering carrier 16.

It is believed that, when the composite signal 10 represented in FIG. 1, is applied to a conventional television receiver, the non-linear characteristics of the receiver produce replicas of the various modulated carriers at frequencies equal to the sums and differences of the various carriers and harmonics thereof. In the absence of the interfering carrier (i.e., with a conventional television signal), the modulated video and audio carriers are non-linearly combined to provide a replica of the audio carrier modulation on an intermediate carrier of 4.5 megahertz (i.e., the difference between the audio and video carrier frequencies), and to provide a replica of the video carrier modulation ranging from 0 to 4 MHz. When the interfering carrier is present, a replica of the videosignal modulation of this interfering carrier is provided in a narrow frequency band about 0 MHz and, in modified form, at 4.5 megahertz (i.e., the second harmonic of the difference between the interfering and video or audio carrier frequencies). The replicas of the modulated interfering carrier and audio carrier signals which are both at 4.5 megahertz compete for the FM channel, but the modulated interfering carrier replica, having a greater energy content, will capture the channel and will cause the normal audio signal to be suppressed as noise. It has been found that a modulated interfering carrier replica which is 6dB above the modulated audio carrier replica is sufficient to capture the FM channel.

In a similar manner, the video and interfering carrier signal replicas at 0 MHz compete for the video channel. The interfering carrier amplitude modulation obliterates the normal video signal, probably, by virtue of two effects. First of all, the additional energy provided by the interfering carrier causes the automatic gain control of the receiver to drop the gain of the receiver down to a level where the reception of the normal video signal is unsatisfactory. In addition, the horizontal synchronizing pulses in the interfering carrier video signal (which are slightly off the standard sync pulse rate) tend to lock the synchronization circuits of the receiver to the interfering signal, so that the normal video signal appears to be out of synchronization. Thus, when the video portion of the interfering carrier captures the receiver, the normal video signal is not discernible, but merely appears as low-level background noise.

Referring now to FIG. 2, there is shown an arrangement for producing the composite RF signal 10 illustrated in FIG. 1. A replacement program, including separate audio and video signals, is provided from a conventional source. As is common in conventional television transmitters, the replacement audio signal is supplied to an audio preemphasis network 30 prior to being utilized for modulating a carrier. The preemphasized audio signal is applied to a conventional frequency modulator 32 via lead 34 and is used to frequency-modulate a carrier signal of frequency $f_O$, which is supplied to modulator 32 from precision oscillator 36 via lead 38. The frequency-modulated carrier from modulator 32 is provided via lead 40 as the carrier input to a conventional amplitude-modulator 42. The replacement video signal serves as the modulating signal for amplitude-modulator 42 and is coupled thereto through a conventional low pass filter 44 and lead 46. Low pass filter 44 is designed to have an upper cutoff frequency substantially lower than is common in the video signal of conventional television systems, so that the spectrum for the amplitude-modulation of the interfering carrier will have a relatively narrow bandwidth, as previously explained. The relationship between the bandwidth of filter 44 and other components in the system is discussed more fully below. In the preferred embodiment, filter 44 has a bandwidth of about 30 KHz. By virtue of the portion of the arrangement of FIG. 2 described thus far, a carrier of frequency $f_O$ is produced on lead 48, which carrier is frequency-modulated with replacement audio information and is amplitude-modulated with replacement video information.

The output signal from amplitude modulator 42 is coupled to a conventional variable attenuator 50 via lead 48, and is provided therefrom to an RF combiner 56 via lead 52 and RF switch 54. The normal television program signal is provided in radio frequency form (for example from a television transmitter), and is coupled via lead 58 to RF preemphasis network 60, in order to produce a sharp peak in the normal program signal in the vicinity of the interfering carrier frequency $f_O$. The preemphasized normal program signal is coupled from RF preemphasis network 60 to RF combiner 56 via lead 62, and RF combiner 56 combines the normal program signal and the modulated interfering carrier to produce, on lead 64, the composite signal 10 depicted in FIG. 1. In operation, variable attenuator 50 is conveniently adjusted to control the magnitude of the interfering carrier relative to the video carrier so as to insure that the replacement signal captures the video and audio portions of a television receiver.

An externally applied remote on/off signal is provided on lead 66 and is coupled as a control signal to RF preemphasis network 60 and RF switch 54. With the remote on/off signal in its "on" condition, the RF switch is rendered conductive and the normal program signal is passed through RF preemphasis network 60, so that the composite output signal 10, as depicted in FIG. 1, is produced on lead 64. With the remote on/off signal in the "off" condition, RF switch 54 is open and the normal program signal is made to bypass RF preemphasis network 60, so that the normal program signal appears on lead 64 and the interfering carrier is absent.

In operation, the remote on/off signal is normally maintained in its "on" condition, so that the normal program is scrambled at an unauthorized receiver and the replacement program is received instead. It might be desirable, for example, to make the replacement program a promotional presentation intended to entice a non-subscriber into subscribing to the normal program. As an added enticement, at some time during the replacement program, the remote on/off signal could temporarily be placed in its "off" condition, thereby permitting the non-subscriber to see a short segment of the normal subscription program which is being transmitted. At the end of this segment, the remote on/off signal returns to its "on" condition, whereupon the signal received at the non-subscriber's receiver is once more scrambled.

FIG. 3 illustrates a preferred gain versus frequency characteristic for RF preemphasis network 60 of FIG. 2. At frequencies substantially below and above the interfering carrier frequency $f_O$, preemphasis network 60 has a substantially constant gain, such as 3.5dB, which compensates for losses due to combiner 56. The gain characteristic achieves a sharp peak, such as 30db at the frequency $f_O$ and has a 3db bandwidth, $\Delta F$, approximately equal to 0.001 $f_O$. Networks for achieving such gain characteristics are well-known in the prior art.

When composite television signal 10, as depicted in FIG. 1, is received at an authorized receiver, it is necessary that the interfering carrier and its modulation be removed from the composite signal before the signal is introduced into the receiver. Referring now to FIG. 4, it will be observed that the interfering carrier and its modulation are effectively removed by inserting a filter 70 ahead of an authorized receiver, so that the composite RF signal 10 from the transmitter is conditioned by the filter 70 prior to being applied to the authorized receiver. In a system with permanent subscribers, each authorized receiver would have a filter 70 permanently connected ahead of the receiver. Unauthorized receivers would not have such a filter, and would therefore receive a scrambled signal, together with the replacement program. It may be desirable, however, to authorize reception of subscription programs on a program-by-program basis. In such instances, the composite RF signal is coupled to the filter 70 through a switch 72 which is controlled by a signal applied to it via a lead 74, as will be more fully explained hereinafter. The switch has two positions, designated as 1 and 2 in FIG. 4. In position 1, the composite RF signal is coupled to the authorized receiver through filter 70 as explained above, but in position 2 the composite signal is bypassed around filter 70, so that the receiver receives the scrambled signal and replacement program.

The operation of switch 72 is conveniently controlled by means of an auxiliary control signal which is injected in the composite RF signal at a carrier frequency which is out of the video and audio spectra. A control information receiver 76 is provided in parallel with switch 72 to extract the control signal from the composite RF signal, and the signal extracted by receiver 76 is applied to a control information decoder 78. Decoder 78 interprets the control signal to determine whether the associated receiver is authorized to receive the particular program being transmitted. Decoder 78 produces, on lead 74, a signal which controls the position of switch 72 in accordance with whether the receiver is or is not authorized to receive the signal being transmitted. Devices such as switch 72, receiver 76 and decoder 78 are well-known in the art and have been used in the manner described herein.

Filter 70 is a sharply tuned band-elimination filter, commonly known as a "notch" filter. Preferably, filter 70 conforms generally to the frequency characteristic of FIG. 3 but is the complement thereof (i.e. the preferred characteristic for filter 70 is obtained by considering the vertical axis of the characteristic of FIG. 3 to be attenuation instead of gain) and includes a much sharper peak at the frequency $f_O$. When the frequency characteristic of filter 70 is closely matched to the frequency characteristic of RF preemphasis network 60 of FIG. 2, the interfering carrier 16 and its modulation are not only effectively removed, but the removal is achieved with minimal distortion of the original video signal spectrum. Thus, the preemphasis network 60 provides gain which compensates for attenuation introduced by filter 70 when producing normal programs. In the preferred embodiment, the attenuation of filter 70 in the immediate vicinity of the frequency $f_O$ substantially exceeds the maximum gain of preemphasis network 60, but the "side" portions of the characteristics of filter 70 and network 60 are substantially identical. As a result the attenuation of filter 70 is only compensated at the side portions. This has the effect of making the attenuation characteristic of filter 70 appear much steeper to the normal television signal (i.e. only the uncompensated portion affects the normal television signal). This helps assure that the scrambling and signal substituting arrangement of the invention does not appreciably degrade the normal subscription television signal. Notch filters which satisfy the requirements of filter 70 are well-known in the art and are commercially available.

The attenuation characteristic of low-pass filter 44 is intimately related to the attenuation characteristic of filter 70. The general purpose of low-pass filter 44 is to limit the spectral content of the replacement video signal so that, when the interfering carrier is modulated with the replacement video signal and bandlimited by filter 44, no appreciable energy is produced outside of the attenuation "notch" of filter 70. Modulation theory teaches that the spectrum of the video modulated interfering carrier on either side of the carrier frequency will be a replica of the spectrum of the bandlimited replacement video signal. Consequently, low-pass filter 44 should be designed so that it produces no appreciable energy beyond a frequency equal to half the width of the "notch" in filter 70. The minimum bandwidth of low-pass filter 44 is selected in accordance with the requirement that the filter should not appreciably attenuate the 15 KHz horizontal synchronization signal. In the preferred embodiment, filter 70 has a maximum attenuation of about 80db and filter 70 and low-pass filter 44 are designed so that all components of the video-modulated interfering carrier are attenuated by at least 55db.

Although specific embodiments of the invention have been disclosed for illustrative purposes, it will be appreciated by those skilled in the art that many additions, modifications and substitutions are possible without departing from the scope and spirit of the invention as defined in the accompanying claims. For example, the invention is not limited to conventional television systems which amplitude-modulate video information on a video carrier and frequency-modulate audio information on a audio carrier. Clearly, interfering carrier 16 could be modulated in any form which would be recognized by the video and audio sections of a receiver in a television system in which scrambling and signal substitution are to be achieved.

What is claimed is:

1. In a television communication system transmitting normal program information by means of a radio frequency signal including separate frequency-spaced audio and video carrier signals, said audio and video carrier signals being modulated, respectively, with the audio and video portions of said normal program information, the method of conditioning said radio frequency signal so that said normal program information is blocked from reproduction in a television receiver having an intercarrier sound system while replacement program information including at least audio information is reproduced in place thereof, said method comprising the steps of:

generating only a single interfering carrier signal, said interfering carrier signal being at a frequency intermediate said audio and video carrier signals;

modulating said interfering carrier signal with said replacement program information; and linearly combining the modulated interfering carrier signal with said radio frequency signal.

2. The method of claim 1 wherein said interfering carrier signal is modulated with both audio and video information from said replacement program, said interfering carrier signal being modulated with the audio and video information by different methods of modulating.

3. The method of claim 2 wherein said interfering carrier signal is modulated by audio information by the same modulating method that is used to modulate said audio carrier signal and said interfering carrier is modulated by video information by the same modulating method that is used to modulate said video carrier signal.

4. The method of claim 3, employed in a television system including a conventional receiver with a non-linear response to said conditioned radio frequency signal whereby replicas of component carrier frequencies thereof are reproduced at a predefined intermediate frequency, said interfering carrier signal being modulated with replacement audio information in a manner that produces greater energy in the replica of the audio-modulated interfering carrier signal at said intermediate frequency than is present in the replica of said modulated audio carrier signal at said intermediate frequency, whereby said modulated interfering carrier signal captures the audio-reproducing portion of said receiver.

5. The method of claim 1 wherein, prior to said inserting step, the magnitude of said radio frequency signal is enhanced in accordance with a predefined gain waveform and in a predefined band of frequencies including the nominal interfering carrier signal frequency and ranging over only a portion of the frequencies included in said radio frequency signal.

6. The method of processing a radio frequency television signal, conditioned in accordance with claim 5, in order to permit the normal program information to be reproduced in a television receiver without appreciable degradation, said method being performed ahead of said receiver and comprising the step of reducing the magnitude of said conditioned radio frequency signal in said predefined frequency band and in accordance with a predefined attenuation waveform which is complementary to said predefined gain waveform over a substantial portion thereof.

7. The method of processing a radio frequency television signal, conditioned in accordance with claim 1 in order to permit the normal program information to be reproduced in a television receiver, said method being performed ahead of said receiver and comprising the step of reducing the magnitude of said conditioned radio frequency signal in a predefined frequency band spanning only a portion of the frequencies in the radio frequency signal and in accordance with a predefined attenuation waveform.

8. The method of claim 1 employed in a television communication system including a receiver having a video section with at least one synchronization circuit and a modulated video carrier signal including a normal synchronization signal, said method including the further step of producing a replacement program information signal with replacement video information and including a replacement synchronization signal which differs in frequency from said normal synchronization signal, said replacement synchronization signal being adapted to lock said synchronization circuit thereto so that said modulated video carrier appears to be out of synchronization whereby said replacement video signal is reproduced in said receiver with video information from said modulated video carrier appearing as background noise.

9. The method of claim 1 employed in a television communication system including a receiver having a conventional automatic gain control circuit for controlling the amplification of applied radio frequency signals, said interfering carrier signal being generated with a magnitude comparable to said video carrier signal magnitude, so that said automatic gain control circuit reduces the amplification of said video-modulated video carrier signal to block the reception thereof and to reproduce said replacement video signal in place thereof.

10. In a television communication system transmitting normal audio and video program information by means of a radio frequency signal including separate frequency-spaced audio and video carrier signals, said audio and video carrier signals being modulated respectively with the audio and video portions of said normal program information, apparatus for conditioning said radio frequency signal so that said normal program information is blocked from reproduction in a television receiver having an intercarrier sound system while replacement program information including at least audio information is reproduced in place thereof, said apparatus comprising:

a generator of only a single interfering carrier signal, said interfering carrier signal being at a frequency intermediate said audio and video carrier signals;

means for modulating said interfering carrier signal by said replacement program information; and a combiner for combining the modulated interfering carrier signal with said radio frequency signal into a composite signal.

11. Apparatus in accordance with claim 10 wherein said replacement program includes audio and video information, said modulating means including a first modulator modulating said interfering carrier signal with replacement audio information, and a second modulator modulating said interfering carrier signal by said replacement video information, said first and second modulators providing different kinds of modulation of said interfering carrier signal.

12. Apparatus in accordance with claim 11 wherein said first modulator modulates said interfering carrier signal by the same type of modulation as is used to modulate said audio carrier signal with audio information and said second modulator modulates said interfering carrier signal by the same type of modulation as is used to modulate said video carrier signal with video information.

13. Apparatus in accordance with claim 12 employed in a television system wherein said receiver has a non-linear response to said radio frequency signal so that replicas of component carrier frequencies thereof are reproduced at a predefined intermediate frequency, said first modulator being constructed and arranged to provide an audio-modulated interfering carrier signal having a replica thereof produced at said intermediate frequency, which replica exceeds in energy the replica of said modulated audio carrier signal at said intermediate frequency, whereby said modulated interfering carrier signal captures the audio reproducing portion of said receiver.

14. Apparatus in accordance with claim 10 wherein said combiner is a linear radio frequency combiner.

15. Apparatus in accordance with claim 10 further including a preemphasis network ahead of said combiner for enhancing the magnitude of said radio frequency signal in accordance with a predefined gain waveform and in a predefined band of frequencies including the frequency of said interfering carrier signal and ranging over only a portion of the frequencies included in said radio frequency signal.

16. In a television communication system incorporating apparatus in accordance with claim 15, means ahead of said television receiver for decreasing the magnitude of said composite signal in said predefined band and in accordance with a predefined attenuation waveform which is complementary to said predefined gain waveform over a substantial portion thereof, so that the modulated interfering carrier is removed without appreciably degrading said normal program information.

17. In a television communication system in accordance with claim 10, means co-located with a television receiver authorized to receive said normal program information for removing said modulated interfering carrier from said conditioned radio frequency signal prior to introducing said radio frequency signal to said receiver.

18. In a television communication system incorporating apparatus in accordance with claim 10 wherein said receiver has a video section with at least one synchronization circuit and said modulated video carrier includes a normal synchronization signal, a source of said replacement program information providing replacement video information including a replacement synchronization signal being adapted to lock said synchronization circuit thereto so that said modulated video carrier appears to be out of synchronization, whereby said replacement video information is reproduced in said receiver with video information from said modulated video carrier appearing as background noise.

19. In a television communication system incorporating apparatus in accordance with claim 11 wherein said receiver has a conventional automatic gain control circuit for controlling the amplification of applied radio frequency signals, said interfering carrier signal generator being constructed and arranged so that said interfering carrier signal has a magnitude comparable to said video carrier signal, so that said automatic gain control circuit reduces the amplification of said normal program information, thereby blocking the reception of said modulated video carrier signal and enabling said receiver to reproduce said replacement video signal in place thereof.

20. In a television communication system for normal program material incorporating audio and video information, said system including a source of replacement program material with at least audio information, at least one transmitter producing a composite radio frequency signal in a channel occupying a predetermined frequency band, said composite radio frequency signal comprising:
an audio carrier signal at a frequency in said band, said audio carrier signal being modulated with said audio information;
a video carrier signal at a different frequency in said band, said video carrier signal being modulated with said video information;
a single interfering carrier signal, said interfering carrier signal being at a frequency intermediate the frequencies of said audio and video carrier signals and being modulated with said replacement program information, so that said normal program information is blocked and said replacement program information is received in place thereof when said composite radio frequency signal is applied to a television receiver having an intercarrier sound system.

21. A system in accordance with claim 20 wherein said replacement program information includes both video and audio components, said interfering carrier signal being modulated with said audio and video components, the audio and video components modulating said interfering carrier signal with different forms of modulation.

22. A system in accordance with claim 21 wherein said audio component modulates said interfering carrier signal with the same form of modulation that is used to modulate said audio carrier signal and said video component modulates said interfering carrier with the same form of modulation that is used to modulate the said video carrier signal.

23. A system in accordance with claim 22 wherein said audio carrier signal is frequency-modulated with said audio information and said video carrier signal is amplitude-modulated with said video information, said interfering carrier signal being frequency-modulated with said audio component and amplitude-modulated with said video component.

24. In a system in accordance with claim 20, at least one television receiver having a non-linear response to said radio frequency signal so that replicas of component carrier signal frequencies thereof are reproduced at a predefined intermediate frequency, said modulated interfering carrier signal having sufficient energy so that a replica thereof at said intermediate frequency exceeds in energy a replica of said modulated audio carrier signal at said intermediate frequency, whereby said modulated interfering carrier signal captures the audio reproducing portion of said receiver.

25. A system in accordance with claim 20 wherein the modulated video carrier signal is enhanced in magnitude in accordance with a predefined gain waveform and in a predefined band of frequencies including the frequency of said interfering carrier signal and ranging over only a portion of the frequencies included in said audio frequency signal.

26. In a system in accordance with claim 25, at least one television receiver, and means co-located with and ahead of each of said television receivers for decreasing the magnitude of said composite signal in said predefined band and in accordance with a predefined attenuation waveform which is complementary to said predefined gain waveform over a substantial portion thereof, so that the modulated interfering carrier is removed without appreciably degrading said normal program information.

27. In a television communication system in accordance with claim 20, at least one television receiver authorized to receive said normal program information, and means co-located with each of said television receivers for removing said modulated interfering carrier signal from said radio frequency signal prior to introducing said radio frequency signal to said receiver.

28. In a television communication system in accordance with claim 20 wherein said modulated video carrier signal includes a normal synchronization signal, a television receiver having a video section with at least one synchronization circuit, and a source of said replacement program material providing replacement video information including a replacement synchronization signal which differs in frequency from said normal synchronization signal, said replacement synchronization signal being adapted to lock said synchronization circuit thereto so that said modulated video carrier appears to be out of synchronization, whereby said replacement video information is reproduced in said receiver, with video information from said modulated video carrier appearing as background noise.

29. In a television communication system in accordance with claim 20 wherein said interfering carrier signal has a magnitude comparable to said video carrier signal, a receiver having a conventional automatic gain control circuit for controlling the amplification of applied radio frequency signals, so that said automatic gain control circuit reduces the amplification of said normal program material, thereby blocking the reception of said modulated video carrier signal and enabling said receiver to reproduce said replacement video signal in place thereof.

30. In a television communication system transmitting normal program information by means of a radio frequency signal including separate frequency-spaced audio and video carrier signals, said audio and video carrier signals being modulated, respectively, with the audio and video portions of said normal program information, the method of conditioning said radio frequency signal so that said normal program information is blocked from reproduction in a television while replacement program information is reproduced in place thereof, said method comprising the steps of:

generating only a single interfering carrier signal, said interfering carrier signal being at a frequency intermediate said audio and video carrier signals, the frequency of said interfering carrier signal being selected so that the frequency difference between said audio and video carrier signals is an integral multiple of the frequency difference between said interfering carrier signal and one of said audio and video carrier signals;

modulating said interfering carrier signal with said replacement program information; and linearly combining the modulated interfering carrier signal with said radio frequency signal.

31. In a television communication system transmitting normal audio and video program information by means of a radio frequency signal including separate frequency-spaced audio and video carrier signals, said audio and video carrier signals being modulated respectively with the audio and video portions of said normal program information, apparatus for conditioning said radio frequency signal so that said normal program information is blocked from reproduction in a television receiver while replacement program information is reproduced in place thereof, said apparatus comprising:

a generator of only a single interfering carrier signal, said interfering carrier signal being at a frequency intermediate said audio and video carrier signals, said interfering carrier signal frequency being such that the frequency difference between said audio and video carrier signals is an integral multiple of the frequency difference between said interfering carrier signal and one of said audio and video carrier signals;

means for modulating said interfering carrier signal by said replacement program information; and a combiner for combining the modulated interfering carrier signal with said radio frequency signal into a composite signal.

32. In a television communication system for normal program material incorporating audio and video information, said system including a source of replacement program material, at least one transmitter producing a composite radio frequency signal in a channel occupying a predetermined frequency band, said composite radio frequency signal comprising:

an audio carrier signal at a frequency in said band, said audio carrier signal being modulated with said audio information;

a video carrier signal at a different frequency in said band, said video carrier signal being modulated with said video information;

a single interfering carrier signal, said interfering carrier signal being at a frequency intermediate the frequencies of said audio and video carrier signals and being modulated with said replacement program information, said interfering carrier signal frequency being selected so that the frequency difference between said audio and video carrier signals is an integral multiple of the frequency difference between said interfering carrier signal and one of said audio and video carrier signals, so that said normal program information is blocked and said replacement program information is received in place thereof when said composite radio frequency signal is applied to a television receiver.

* * * * *